United States Patent [19]

Blossfeld

[11] 3,936,630
[45] Feb. 3, 1976

[54] INTEGRATED SEMICONDUCTOR DEVICE FOR SCANNING AN IMAGE

[75] Inventor: Lothar Blossfeld, Hochdorf, Germany

[73] Assignee: ITT Industries, Inc., New York, N.Y.

[22] Filed: Dec. 24, 1974

[21] Appl. No.: 536,053

[30] Foreign Application Priority Data
Jan. 30, 1974 Germany............................ 2404237

[52] U.S. Cl. ............. 250/211 J; 250/209; 307/311; 357/31
[51] Int. Cl.² ......................................... H01L 31/00
[58] Field of Search ................. 250/211 J, 209, 578; 357/30, 31; 307/311

[56] References Cited
UNITED STATES PATENTS

| | | |
|---|---|---|
| 3,480,780 | 11/1969 | List et al............................. 250/209 |
| 3,617,823 | 11/1971 | Hofstein....................... 250/211 J X |
| 3,648,051 | 3/1972 | Weckler........................... 250/211 J |
| 3,717,770 | 2/1973 | Dyck et al........................ 250/211 J |
| 3,721,839 | 3/1973 | Shannon ....................... 307/311 X |

Primary Examiner—James W. Lawrence
Assistant Examiner—E. R. LaRoche
Attorney, Agent, or Firm—John T. O'Halloran; Menotti J. Lombardi, Jr.; Vincent Ingrassia

[57] ABSTRACT

A device for scanning optical images wherein light intensity of a scanned image line is converted to a pulse width modulation rather than a charge profile. A photo transistor row is connected to an inverter chain, and OR-gates have outputs which are fed to a common read line while the input signal of each OR-gate is tapped over coordinated partial rows of the photo transistor row.

8 Claims, 4 Drawing Figures

INTEGRATED SEMICONDUCTOR DEVICE FOR SCANNING AN IMAGE

BACKGROUND OF THE INVENTION

This invention relates to an integrated semiconductor device with a row of transistors for scanning an image.

Semiconductor devices for scanning optical images are known in the art. In this connection, charge-coupled semi-conductor devices (CCD) and integrated bucket-brigade circuits must be mentioned, reference being made to the journals "Electronics" of Feb. 28, 1972, pp. 62 to 77 and of Dec. 6, 1971, pp. 86 to 91, and "IEEE Transactions on Electron Devices", Vol. ED-18, No. 11 (November 1971), pp. 996 to 1,003.

With such a known device in the form of an integrated bucket-brigade circuit with a row of transistors an image line is converted to a charge profile, and this charge profile is transported through the chain. This has the disadvantage that charges are lost on the way. Compensating for this disadvantage by inserting amplifier stages has the disadvantage that the signal-to-noise ratio deteriorates.

SUMMARY OF THE INVENTION

It is an object of the present invention to provide a semi-conductor device for scanning an image which converts the light intensity of the line to be scanned not to a charge-density variation but to a pulse-width-modulated signal and to use an inverter chain for this purpose.

According to a broad aspect of the invention there is provided an integrated semiconductor device for scanning an image comprising: a row of photosensitive transistors coupled together as a row of inverters and exposed to the brightness profile of a scanned line, said row comprising a plurality of partial rows; a common read line; a plurality of groups of gates, each of said gates having outputs coupled to said common read line and the inputs of each of said plurality of groups coupled to an allotted partial row such that each gate converts a light intensity change via a change in transit speed in the associated partial row to pulse-width changes at said common read line; and a switch coupled to the first transistor of said row of inverters for triggering the scanning operation.

The above and other objects of the present invention will be clearly understood from the following detailed description taken in conjunction with the accompanying drawings, in which:

DESCRIPTION OF THE PREFERRED EMBODIMENT

Figure 1:
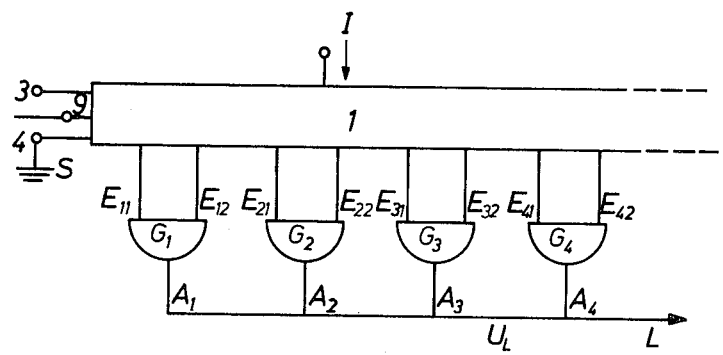
FIG. 1 is a block diagram of the integrated semiconductor device according to the invention.
Figure 3:
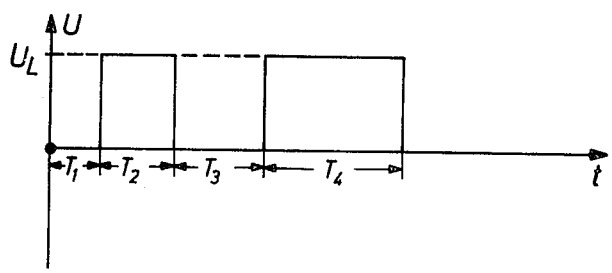
FIG. 3 is a graphical diagram which shows the changes of state at the read line of the integrated semiconductor device according to the invention.

In the block diagram of FIG. 1, showing the integrated semiconductor device according to the invention, a potential $U_L$ is produced on the read line L via gates $G_1, G_2, G_3, G_4 \ldots$; it is assumed to have the two states 0 and 1, which are alotted to the voltage values 0 and $+U_L$ as shown in FIG. 3. This can be done by using an OR-gate which satisfies the truth table:

| $E_{i1}$ | $E_{i2}$ | L |
|---|---|---|
| 0 | 0 | 0 |
| 1 | 0 | 1 |
| 0 | 1 | 1 |
| 1 | 1 | 1 |

Figure 2:
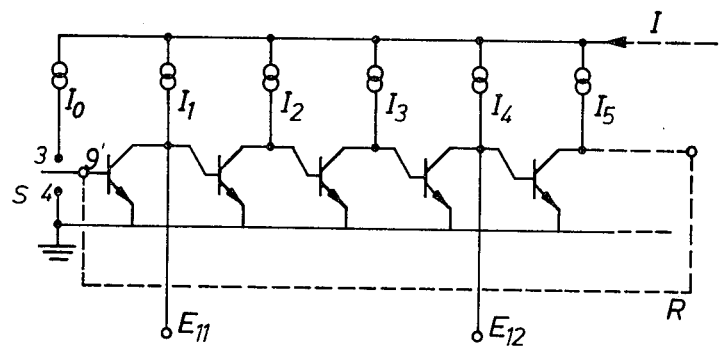
FIG. 2 is a schematic diagram of part of an inverter row containing bipolar transistors.

In this case an odd number of inverter stages must be provided between the input pairs $E_{i1}$, $E_{i2}$ of each gate $G_i$, as shown in FIG. 2 with three d-c coupled transistors between $E_{11}$ and $E_{12}$.

Prior to scanning, the inverter chain is brought to the state which changes the input $E_{11}$ of the first gate $G_1$ to the 1-state. To this end, a switch S with two switch-contact terminals 3 and 4 and the switch-lever terminal is provided in front of the inverter chains of FIGS. 1 and 2. This switch S is to indicate a means which is capable of setting the initial state of the inverter chain and triggering the scanning.

The initial state of the integrated semiconductor device of FIGS. 1 and 2 is set by throwing the switch to the switch-contact terminal 4, thereby shorting the emitter-base path of the first transistor of the row. The scanning is triggered by changing the position of the switch at the input of the inverter row after a "1" was set at $E_{11}$ as described above. In the case of FIGS. 1 and 2, this is done by throwing the switch from the switch-contact terminal 4 to the switch-contact terminal 3, with a current being injected into the base-emitter path of the first transistor of the row via the current source $I_o$. The change of state effected at the input of the inverter chain 1 passes through the inverter chain at a speed which is dependent on, among other things, the luminance at the partial rows between the inputs $E_{i1}$ and $E_{i2}$. When the change of state has reached the input $E_{11}$ of the gate $G_1$, the state on the read line L changes from 1 to 0; when the state has reached $E_{12}$, the state of the read line L returns to 1 in accordance with the truth table. When this change of state of the inverter chain reaches the input $E_{11}$, the state of the read line L changes from 1 to 0, etc.

The speed at which the chain's change of stage passes through the gates $G_1, G_2 \ldots G_n$ generates on the read line L pulses of the duration $T_1$ as long as the change of state in the chain is between the inputs $E_{11}$, $E_{12}$, and pulses of the duration $T_2$ as long as the change of state is between the inputs $E_{12}$ and $E_{21}$, as shown in FIG. 3.

The mean pulse widths on the read line L are proportional to the currents with which the inverters are operated. These currents may be composed of (a) the light-injected current and (b) the currents set via the constant current sources $I_1, I_2, I_3 \ldots$.

A pulse-width-modulated signal as shown in FIG. 3 can be converted, in known manner, to an amplitude-modulated video signal using a pulse-width demodulator whose input is connected via the read line L to the outputs $A_1 \ldots A_n$ of the gates $G_1 \ldots G_n$, and can be made visible.

Figure 4:
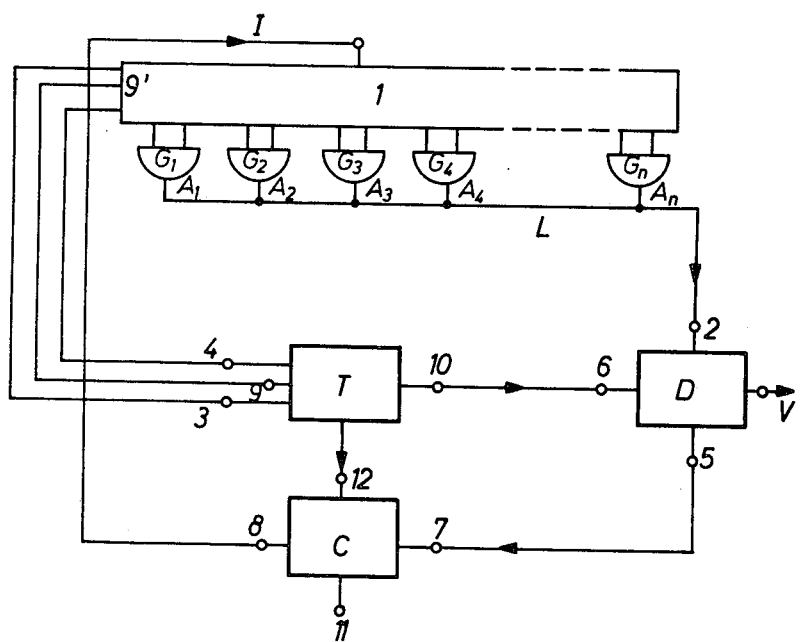
FIG. 4 shows an improvement of the integrated semiconductor device according to the invention.

In the improvement of the invention shown in the block diagram of FIG. 4, the scan frequency is so determined via a clock generator T comprising the switch S that, after a phase comparison in the control circuit C, a control current I is supplied via the control circuit's first output 8 to the constant current sources $I_1, I_2, I_3 \ldots$ which has a value corresponding to the sum of the currents of the constant current sources; this serves to control the mean signal transit time of the inverter chain 1. The clock generator T provides the line frequency and replaces the switch S of FIGS. 1 and 2 with the terminals 3, 4 and 9. The pulse-width comparison in the demodulator D, whose input 2 is connected to the read line L, is effected at a clock frequency which is higher by the number of picture elements and is fed into the demodulator D via the connection between the output 10 and the demodulator's second input 6. The voltage supply is connected to the terminal 11. The nominal value is fed into the phase comparison stage E via 12, while the actual value comes from the second output 5 of the demodulator D and is introduced via 7. V designates the video-signal output.

For the constant scanning of a motion picture, the inverter chain 1 is connected as a ring oscillator; this is indicated by the feedback line R in FIG. 2. In this case the clock generator T of FIG. 4 may be omitted. The ring oscillator is equipped with an odd-numbered row of transistors. Demodulation is effected by a low-path filter or by suitable demodulators.

As load resistances of the inverters, integrated constant current sources $I_1, I_2, I_3 \ldots I_n$ are preferably used. The advantage of an integrated semiconductor device as shown in the block diagram of FIG. 4 lies in the fact that the pulse-width change is proportional only to the luminance change, i.e. independent of the mean incident light intensity. In the case of the integrated semiconductor device of FIG. 4 it is not necessary to adjust the mean luminance by a mechanical diaphragm and readjust the average brightness level of the picture.

The sensitivity of an integrated semiconductor device according to the invention depends on the pulse-width demodulator D and the noise properties of the inverters used. The lower the dynamic internal resistance of the inverters, the greater the signal-to-noise ratio. The bipolar transistors may be replaced by unipolar ones, particularly MIS field-effect transistors.

Chip area can be particularly small if the integrated semiconductor device is made using injection-logic technology — as is disclosed in the "Digest of Technical Papers" of the 1972 IEEE International Solid-State Circuits Conference, pp. 90 to 93 and 219 — or planox technology — as is described in the journal "Electronics" of Dec. 20, 1971.

While the principles of the invention have been described above in connection with specific apparatus, it is to be clearly understood that this description is made only by way of example and not as a limitation on the scope of the invention.

What is claimed is:

1. An integrated semiconductor device for scanning an image comprising:
    a row of photosensitive transistors coupled together as a row of inverters and exposed to the brightness profile of a scanned line, said row comprising a plurality of partial rows;
    a common read line;
    a plurality of groups of gates, each of said gates having outputs coupled to said common read line and the inputs of each of said plurality of groups coupled to an allotted partial row such that each gate converts a light intensity change via a change in transit speed in the associated partial row to pulse-width changes at said common read line; and
    a switch coupled to the first transistor of said row of inverters for triggering the scanning operation.

2. An integrated semiconductor device according to claim 1 wherein said transistors are connected in a row as a ring oscillator.

3. An integrated semiconductor device according to claim 2 wherein an odd numbered row of transistors are connected as inverters.

4. An integrated semiconductor device according to claim 3 wherein said gates are OR-gates.

5. An integrated semiconductor device according to claim 1 further including a plurality of constant current sources as load resistances of the transistors connected as inverters.

6. An integrated semiconductor device according to claim 5 further including means for controlling said constant current sources to control the inverter chain transit time.

7. An integrated semiconductor device according to claim 1 wherein said switch means short-circuits the base of the first transistor of the inverter row with respect to its emitter for triggering the scanned operation.

8. An integrated semiconductor device according to claim 1 further including a current source, said switch means d-c connecting the base of the first transistor of the inverter row to said current source for triggering the scanning operation.

* * * * *